US005660387A

United States Patent [19]
Stokes

[11] Patent Number: 5,660,387
[45] Date of Patent: Aug. 26, 1997

[54] POLYHEDRON PUZZLE

[76] Inventor: William T. Stokes, 1125 Robin Way, Sunnyvale, Calif. 94087

[21] Appl. No.: 590,452

[22] Filed: Jan. 23, 1996

[51] Int. Cl.⁶ .............................. A63F 9/12; G09B 23/04
[52] U.S. Cl. ........................................ 273/157 R; 434/211
[58] Field of Search ............................ 273/153 R, 156, 273/157 R; 434/188, 208, 211, 187, 207

[56] References Cited

U.S. PATENT DOCUMENTS

| 176,735 | 5/1876 | Bradbury | 434/187 |
| 3,204,343 | 9/1965 | Pollock | 434/207 X |
| 3,645,535 | 2/1972 | Randolph | 273/157 R |
| 4,258,479 | 3/1981 | Roane | 434/211 |

OTHER PUBLICATIONS

Welch Scientific Co. Catalog, p. 939, Item No. 7589, Oct. 1965.

*Primary Examiner*—William H. Grieb
*Attorney, Agent, or Firm*—Thomas M. Freiburger

[57] ABSTRACT

A set of polyhedrons have shapes capable of fitting together, in one or more ways, into a solid geometric shape such as a rectangular solid or more specifically, a cube. The polyhedrons include five-sided polyhedrons made up of a regular tetrahedron and an irregular tetrahedron abutted together as one solid; alternately, the two separate tetrahedra can be included in lieu of one or more of the five-sided polyhedrons, for assembly in the puzzle. The set of polyhedrons includes separate irregular tetrahedra and may include a regular octahedron. Preferably each shape of polyhedron is in a different color. In a preferred embodiment, the polyhedrons are all solid throughout and are of the same density, and that density is preferably the same density as water to enable the teaching of certain relationships. The set of polyhedrons function not only as a puzzle, for fitting into a transparent housing such as a cube, but also for educational purposes in teaching geometry.

13 Claims, 5 Drawing Sheets

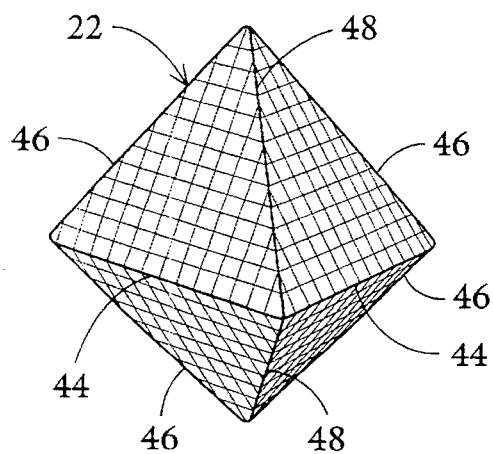
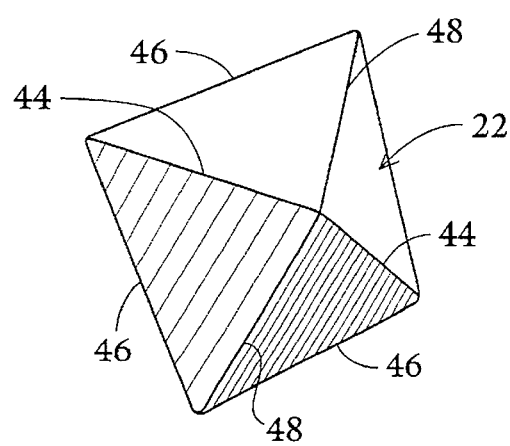
FIG. 2A         FIG. 2B
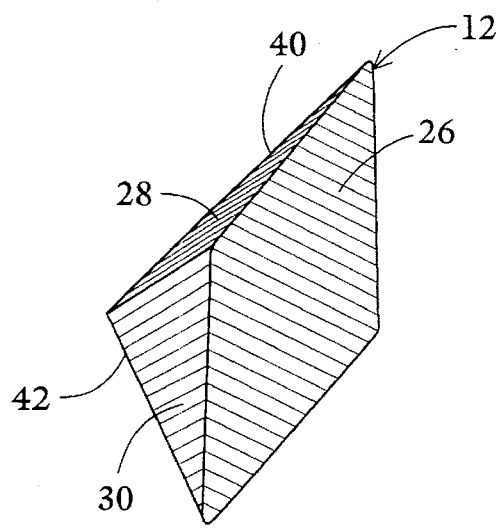
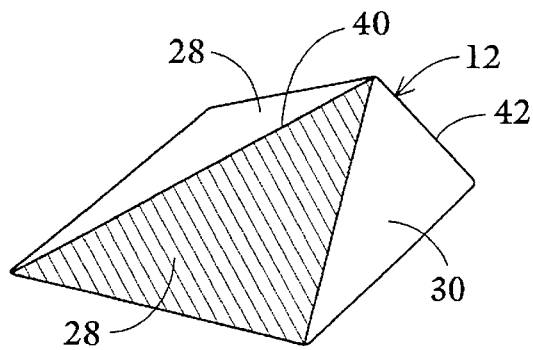
FIG. 3A         FIG. 3B

POLYHEDRON PUZZLE

BACKGROUND AND SUMMARY OF THE INVENTION

This invention is in the field of hand-manipulated puzzles, as well as the teaching of geometric principles. More specifically, the invention concerns a puzzle formed of a set of different polyhedrons which can be assembled together in different ways to form solid geometric shapes such as rectangular solids.

Numerous geometric puzzles have been known in the past, both in two dimensions, as in plane geometry, and in three dimensions, as in solid geometry. However, none has demonstrated spatial relationships, symmetry, dissection of polyhedral solids, congruent triangles and other geometric and physical relationships as well as the set of polyhedrons and puzzle apparatus of this invention.

In the polyhedron puzzle of the invention, a clear plastic container or housing is provided in one embodiment, in a selected geometric shape such as a rectangular solid or a cube. The plastic container is closed at five sides and open at one side to enable assembling of the polyhedron puzzle pieces into the interior of the container. In a specific embodiment, three or more different shapes of polyhedrons are provided as puzzle pieces, each being solid throughout.

In one preferred embodiment of the invention, different shapes of polyhedrons of the set of polyhedrons are in different colors—for example, the colors blue, green and yellow can be used, or blue, green, yellow and red. The set preferably includes a five-sided polyhedron, comprised of a regular tetrahedron and an irregular tetrahedron as formed together along a matching triangular plane of each tetrahedron. These five-sided polyhedrons can all be replaced, or some of them can be replaced, with separate regular tetrahedrons and irregular tetrahedrons which, when one of each is laid together in the puzzle, will form the five-sided polyhedron. Similarly, a regular octahedron which may be included in set of polyhedrons may be replaced by four irregular tetrahedrons. These substitutions create additional configurations for assembly of the polyhedrons into the clear container or housing, which may be in the form of a cube.

Another aspect of the invention is that all of the polyhedrons included in the set are of the same density. This can enable a teacher to demonstrate, for example, that the five-sided polyhedron is equivalent to the combination of the regular tetrahedron and the irregular tetrahedron, by using a balance scale. In a specific form of the invention, the density of all polyhedrons is the same as that of water, i.e. a specific gravity of 1.0. This property can be used to demonstrate, by displacement of water, that certain combinations of shapes are equal in volume to other polyhedral shapes. Since water is the standard substance used to measure and express weight/volume relationships (density), when any piece of specific gravity 1.0 is caused to displace its own weight in water, this allows both weight and volume comparisons to be made. To demonstrate such relationships, one can use a graduated beaker and a balance scale, or even a coffee can filled to capacity in a pie tin. One can insert various combinations of pieces of the puzzle and show various weight/volume relationships to each other (or to multiples of each other) and to the whole. Volume, surface area and displacement can be demonstrated, with this easily used manipulative device. Obviously, the invention provides ways to demonstrate and to physically verify (and reinforce) what can be calculated mathematically.

With a set of polyhedrons in accordance with the invention, students learn to visualize and think more clearly about spatial relationships, dissection of solid shapes, matching triangles, volume of geometric objects and other geometric and physical relationships. The puzzle, including the clear container in the shape of a cube, for example, helps teach students to consider shapes in the context of negative space, somewhat like putting together a puzzle but in three dimensions, and demonstrates concepts of surface area.

In addition, polyhedron puzzles according to the invention provide challenge and enjoyment along with the learning of relationships in solid geometry.

It is therefore among the objects of the invention to teach some of the principles of solid geometry, spatial relationships, symmetry and dissection of solid shapes, through the provision of a puzzle which is enjoyable to manipulate and to solve. These and other objects, advantages and features of the invention will be apparent from the following description of a preferred embodiment, considered along with the accompanying drawings.

DESCRIPTION OF THE DRAWINGS

FIGS. 2A and 2B are perspective views showing an octahedron which may form a part of a set of polyhedrons of the invention.

FIGS. 3A and 3B are perspective views showing a five-sided polyhedron which may form a component of the set of polyhedrons of the invention.

DESCRIPTION OF PREFERRED EMBODIMENTS

Figure 1:
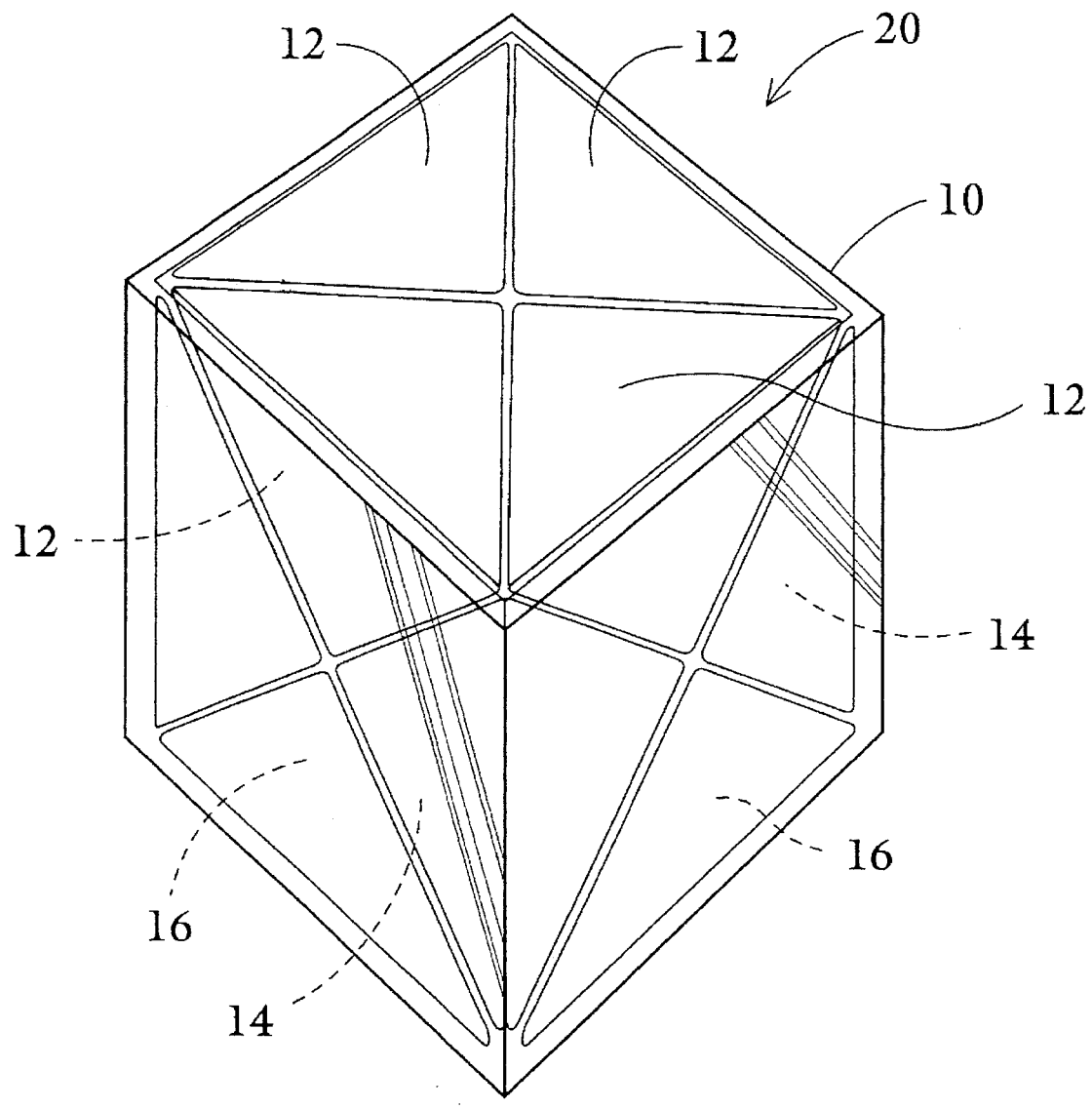
FIG. 1 is a perspective view showing one embodiment of a polyhedron puzzle according to the invention, with a plurality of interfitted solid geometric shapes fitted into a transparent cubic container.

In FIG. 1 a transparent cubic container 10, preferably of plastic material, holds a series of polyhedrons 12, 14 and 16, forming the polyhedron puzzle 20. The polyhedron pieces preferably comprise at least three different shapes and may comprise four or five different shapes, all of which are shown in FIGS. 2A through 6. In FIG. 1, sides of the polyhedrons 12, 14 and 16 are visible through the walls of the cubic container 10. There are several arrangements in which the polyhedrons can be assembled into an essentially solid cube in the container 10, without internal voids (except small gaps at intersections). In FIGS. 2A and 2B, regular octahedron 22 is illustrated, in two different views. FIGS. 3A and 3B show a five-sided polyhedron 12 in two different views, which is seen in the assembled puzzle 20 in FIG. 1. The polyhedron 12 has a parallelogram surface 26 or triangular surfaces 28 and 30. As noted above, the five-sided polyhedron or pentahedron 12 is of a shape preferably comprised of a regular tetrahedron 32 and an irregular tetrahedron 34, as demonstrated in FIG. 6 which shows the regular and irregular tetrahedra 32 and 34 separated from one another, but which, when pushed together, would make the shape shown in FIG. 3B. The irregular tetrahedron 34 and the regular tetrahedron 32 are also shown in FIGS. 4A–B and FIGS. 5A–B, respectively.

Figure 6:
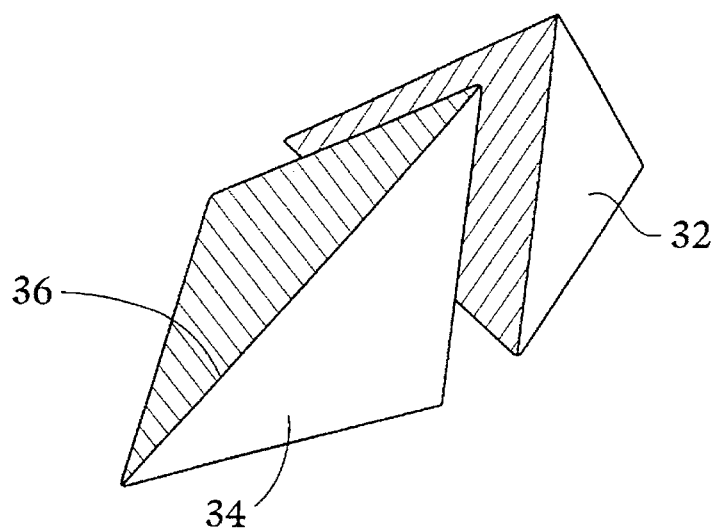
FIG. 6 is a perspective view showing the polyhedrons of FIGS. 4 (A and B) and 5 (A and B) and demonstrating that the two tetrahedrons together make the shape of the five-side polyhedron of FIG. 3 (A and B).

In one embodiment of the puzzle of the invention, the irregular tetrahedron 34 is a necessary component, while the regular tetrahedron 32 is not. The cubic puzzle 20 shown in FIG. 1 can be put together with eight of the five-sided polyhedrons 12, four of the irregular tetrahedrons 34, and one regular octahedron 22. Alternatively, some of the five-sided polyhedrons 12 can be replaced by the combination of an irregular tetrahedron 34 and a regular tetrahedron 32, as shown in FIG. 6. All of the five-sided polyhedrons 12 can be thus replaced if desired, or any number of them.

Figure 4A:
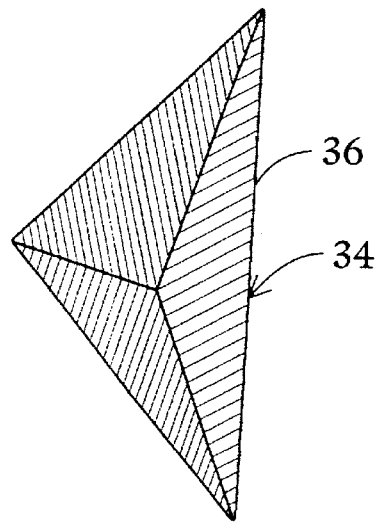
FIGS. 4A and 4B are perspective views showing an irregular tetrahedron which may form a component of the set of polyhedrons of the invention.
Figure 4B:
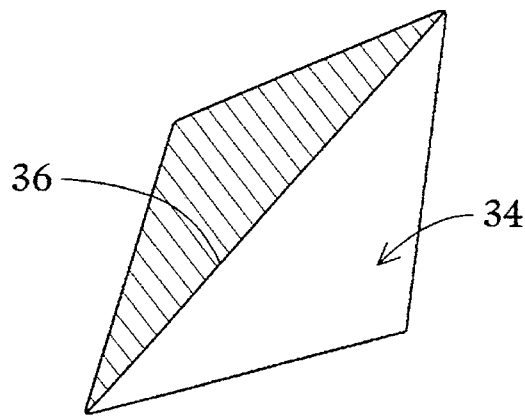
Figure 5A:
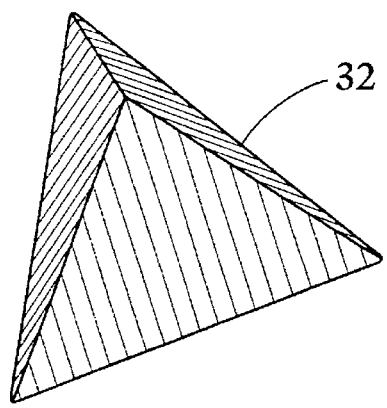
FIGS. 5A and 5B are perspective views showing a regular tetrahedron which may form a component of the set of polyhedrons of the invention.
Figure 5B:
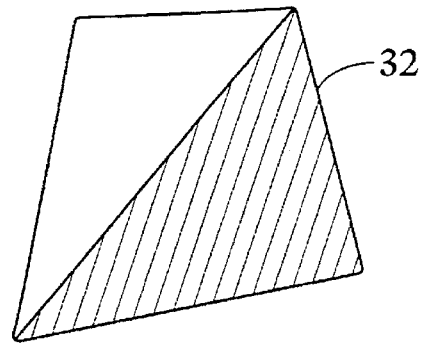
Figure 7:
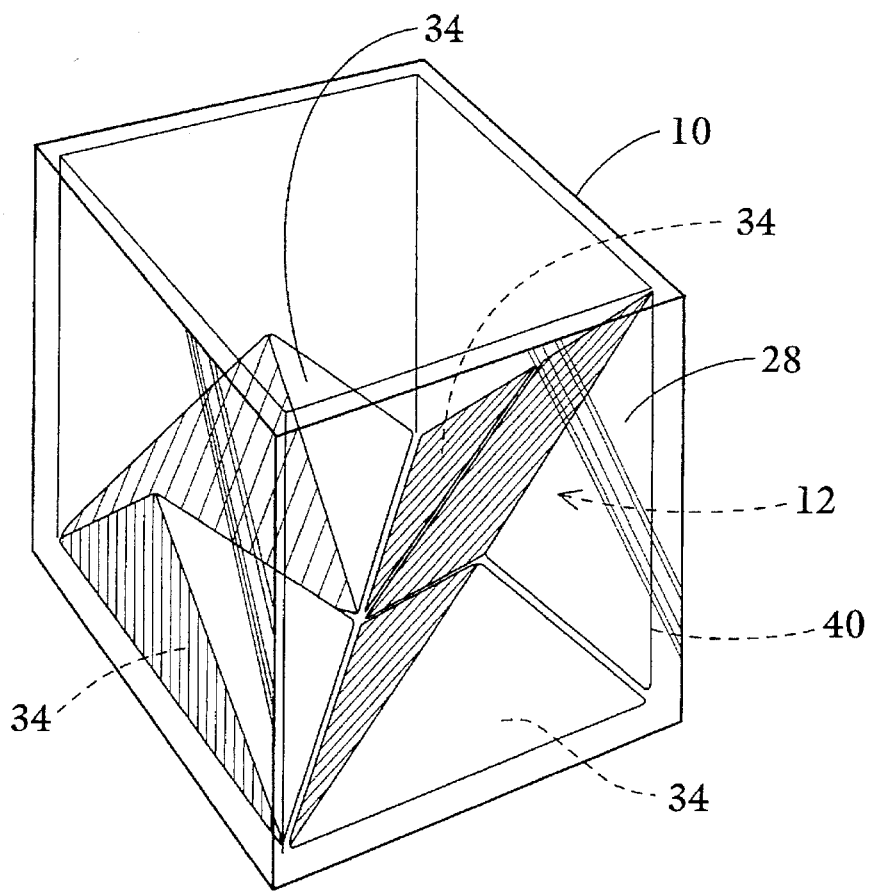
FIG. 7 is a view similar to FIG. 1, but showing the cubic container with only a few polyhedron pieces of the puzzle assembled into the container.

FIG. 7 shows the cubic transparent container 10 with only a few of the polyhedron puzzle pieces placed into the container, demonstrating one sequence for solving of the puzzle by correctly positioning the different polyhedrons in the container to form a cube. In FIG. 7, four of the irregular tetrahedrons 34 have been first placed into the container. Each irregular tetrahedron has a right angle edge 36, as shown in FIGS. 4A, 4B and 6. This right angle line is placed so as to be nested into the right angle formed between one of the sides and the bottom of the cubic container 10 as shown in FIG. 7. The irregular tetrahedrons have a length which loosely fits within the container, being, for example, about 1/16 inch to 1/8 inch shorter than the internal dimension of a side of the container. An important aspect, which is a teaching attribute of the puzzle 20, is that it challenges the user to identify angles in solid geometrical shapes, i.e. in tetrahedrons and other polyhedrons, and to logically deduce that these angles must fit within corresponding angles of the cubic container or of interfaces between polyhedrons which have already been assembled into the container.

Once the four irregular tetrahedrons 34 have been placed into the container 10 as shown, four of the five-sided polyhedrons 12 are placed into the container, one such five-sided polyhedron 12 being shown in the container in FIG. 7. Again, the user/player can deduce this position by finding right angles on the five-sided polyhedron 12. Two right angles exist on the polyhedron 12. One at an edge 40 defined between the two faces 28 of the polyhedron, as shown in FIGS. 3A and 3B; as seen in FIG. 7, this right-angle edge 40 is nested in the right angle defined between two of the walls of the cubic container. The other right angle is defined between the edge 40 and an adjacent edge 42 which is defined between faces 30 of the polyhedron as shown in FIGS. 3A and 3B. The right angle on the polyhedron 12 between the edges 40 and 42 can be observed by the user/player, which suggests that the polyhedron 12 can reside in the cubic container such that the two edges 40 and 42 engage against a side and the bottom of the container or against some vertical component in the bottom of the container. This is the case as shown in FIG. 7, where the shorter edge 42 is hidden from view but rests against the bottom of the container, and the longer edge 40 is positioned in the corner formed between two walls as discussed above.

As noted above, the five-sided polyhedron 12 in FIG. 7 could be replaced with a regular tetrahedron 32 and an irregular tetrahedron 34, if sufficient pieces are provided.

Figure 8:
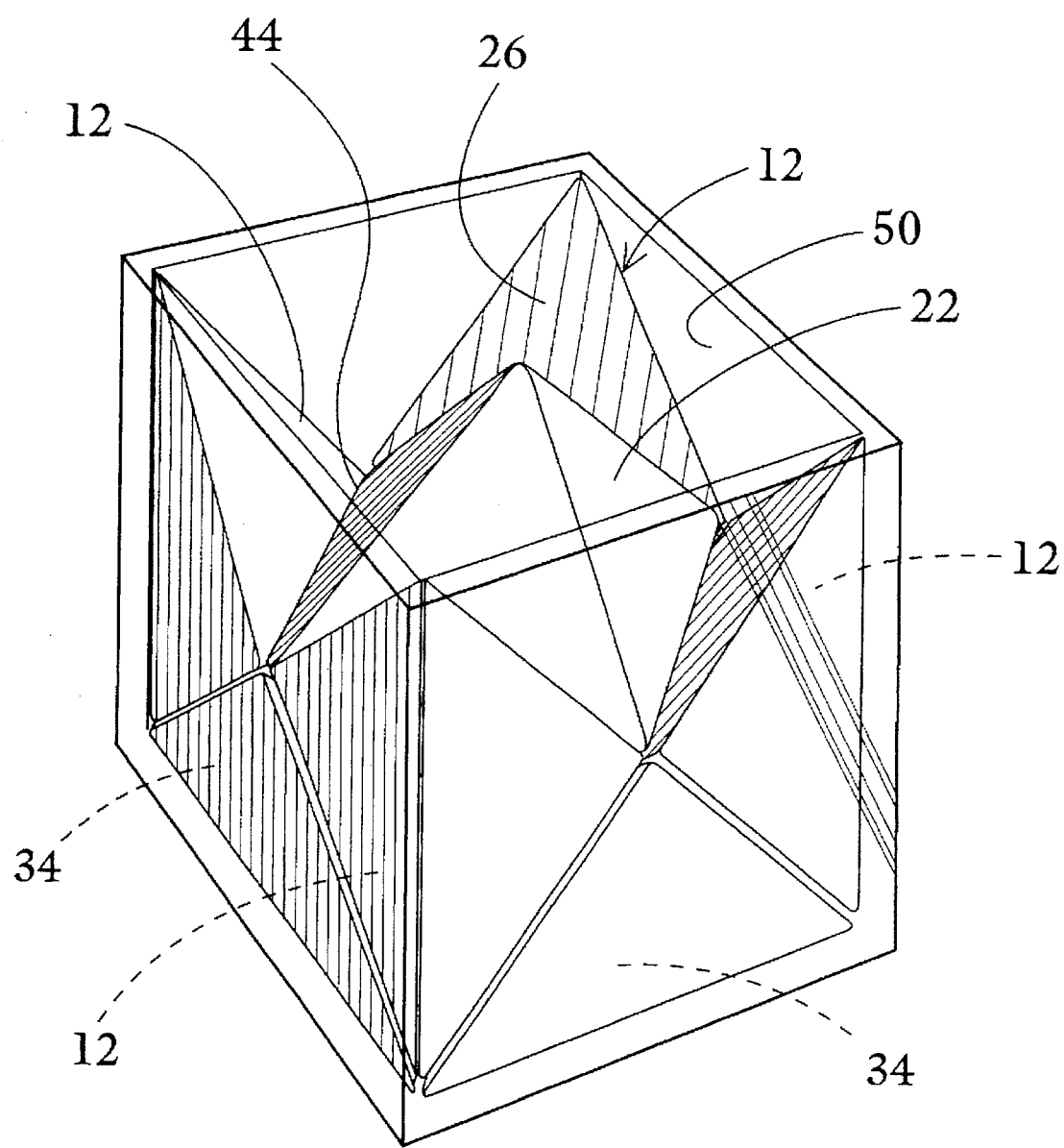
FIG. 8 is a view similar to FIG. 7, with additional polyhedron pieces assembled into the container.

The completion of the puzzle is continued by placing three additional five-sided polyhedrons 12 into the container, in a manner similar to what is shown for the one polyhedron 12 in FIG. 7. FIG. 8 shows four of the five-sided polyhedrons 12 as thus assembled into the corners of the container. FIG. 8 also shows that the regular octahedron 22 has also been assembled into the puzzle. The octahedron has no right angles between faces, but has right-angle relationships between adjacent exterior edges which are part of a family of edges that lie in a single plane. Thus, edges 44 in the octahedron 22 shown in FIGS. 2A and 2B lie in a common plane and adjacent edges 44 define right angles. Note that adjacent edges 46 also lie in a different common plane and also define right angles between adjacent edges, as do edges 48 in a third common plane.

This right angle relationship of circumferential, coplanar edges of the regular octahedron 22 can be seen by a user of the puzzle to correspond to level, midway lines across the four five-sided polyhedrons 12, on the large exposed faces 26 as shown in FIG. 8. A level line is shown at 44 in FIG. 8, corresponding to one of the edges 44 of the octahedron 22.

There are several other angular relationships which could be appreciated by the user of the game in deducing that the octahedron 22 will fit into the puzzle as indicated. For example, the angle that each of the four oblique planes in the bottom half of the octahedron makes with a vertical axis is the same angle at which the large faces 26 of the five-sided polyhedrons 12 recline. This angle is a familiar one, since on the five-sided polyhedron 12, the short edge 42, the long adjacent right-angle edge 40 and the large face 26 form a three-four-five right triangle. Also, it can be seen that four of the irregular tetrahedrons 34, which have a long edge 36 corresponding to the length of a side or the height of a cube at a central axis, can be assembled together in the same location, with the edges 36 vertical and centrally located, to form the same shape as the regular octahedron 22.

In any event, the user will find that the regular octahedron falls right into place in the assembly shown in FIG. 8.

The next step is to fill the spaces left in the cube, by the assembly shown in FIG. 8. Four of the five-sided polyhedrons will fit to fill this space (or, alternatively, assemblies of the regular and irregular polyhedrons 32 and 34, or combinations thereof). The user can deduce the solid geometrical relationship which leads to fitting these five-sided polyhedrons into the spaces. For example, a triangle is left at each side of the cube at a location identified as 50 in the drawings. Each of the polyhedrons 12 has a triangular face 28 of congruent shape. Also, each of the polyhedrons 12 also has smaller triangular faces 30 which fit congruently with the remaining exposed surface of the large face 26 of each of the assembled polyhedrons 12 as shown in FIG. 8. There also exists the right angle relationship between the edges 40 and 42 of the five-sided polyhedrons. From these relationships it can be deduced that four of the five-sided polyhedrons will fit to fill the remaining space in FIG. 8, to a completed puzzle configuration as shown in FIG. 1.

Further relationships in geometry can be observed by substituting positions of polyhedron pieces and experimenting. Also, the pieces can be used to build large polyhedrons of similar shapes, to build a cuboctahedron within the clear plastic cube, to demonstrate Euler's formula, and many other exercises to demonstrate mathematical principles and relationships.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A polyhedron puzzle comprising:

a clear sided container in a selected geometric shape closed at all but one side, and a set of polyhedrons, including a plurality of different shapes, including an integral five-sided polyhedron shape which is comprised of a regular tetrahedron and an irregular tetrahedron abutted together, at least some of the polyhedron shapes being capable of being fitted and nested together to fit within the container without any substantial internal voids, all of the polyhedrons having essentially the same density.

2. A polyhedron puzzle comprising:

a clear sided container in a selected geometric shape closed at all but one side, and a set of polyhedrons, including a plurality of different shapes, including separate regular and irregular tetrahedrons of a size to fit abutted together to form a five-sided polyhedron shape, at least some of the polyhedron shapes being capable of being fitted and nested together to fit within the container without any substantial internal voids, all of the polyhedrons having essentially the same density.

3. A set of polyhedrons according to claim 2, wherein each of the different shapes of polyhedrons is of a different color.

4. A set of polyhedrons according to claim 2, wherein each of the polyhedrons is solid throughout.

5. A polyhedron puzzle comprising:

a clear sided rectangular container closed at all but one side, and a set of polyhedrons, including a plurality of different shapes of polyhedrons, one polyhedron being a regular octahedron, the shapes being such that the plurality of polyhedrons can be fitted together to form a rectangular solid having six planar exterior sides, such that the rectangular solid fits within the rectangular container without any substantial internal voids.

6. A set of polyhedrons as in claim 5, wherein the polyhedron shapes are such that the plurality of polyhedrons can be fitted together to form a solid cube.

7. A set of polyhedrons as in claim 5, including at least three different shapes of polyhedrons.

8. A set of polyhedrons according to claim 5, including at least four different shapes of polyhedrons.

9. A set of polyhedrons according to claim 5, including a five-sided polyhedron shape which is comprised of a regular tetrahedron and an irregular tetrahedron abutted together.

10. A set of polyhedrons according to claim 5, wherein each of the different shapes of polyhedrons is of a different color.

11. A set of polyhedrons according to claim 5, wherein each of the polyhedrons is solid throughout.

12. A set of polyhedrons as in claim 5, wherein all of the polyhedrons are of the same density.

13. A set of polyhedrons as in claim 12, wherein each of the polyhedrons has a density essentially equal to that of water.

* * * * *